(12) United States Patent
Criel et al.

(10) Patent No.: US 9,834,430 B2
(45) Date of Patent: Dec. 5, 2017

(54) METHOD AND SYSTEM FOR CONTROLLING A FILLING OPERATION OF A VEHICULAR LIQUID STORAGE SYSTEM

(71) Applicant: Plastic Omnium Advanced Innovation and Research, Brussels (BE)

(72) Inventors: Bjorn Criel, Sint-Martens-Lennik (BE); Antoine Chaussinand, Brussels (BE); David Hill, Commerce Township, MI (US); Scott McCleary, White Lake, MI (US); Jurgen Dedeurwaerder, Relegem (BE); Mihai Baja, Brussels (BE)

(73) Assignee: Plastic Omnium Advanced Innovation and Research, Brussels (BE)

( * ) Notice: Subject to any disclaimer, the term of this patent is extended or adjusted under 35 U.S.C. 154(b) by 65 days.

(21) Appl. No.: 14/824,472

(22) Filed: Aug. 12, 2015

(65) Prior Publication Data

US 2016/0060093 A1   Mar. 3, 2016

Related U.S. Application Data

(60) Provisional application No. 62/045,348, filed on Sep. 3, 2014.

(30) Foreign Application Priority Data

Oct. 14, 2014   (EP) ..................... 14188770

(51) Int. Cl.
   *B67D 7/36*   (2010.01)
   *G01F 23/00*  (2006.01)
   (Continued)

(52) U.S. Cl.
   CPC ............ *B67D 7/362* (2013.01); *B60K 15/035* (2013.01); *B67D 7/04* (2013.01); *G01F 23/00* (2013.01); *B60K 2015/03576* (2013.01)

(58) Field of Classification Search
   CPC ........ B67D 7/362; B67D 7/04; B60K 15/035; B60K 2015/03576; G01F 23/00
   (Continued)

(56) References Cited

U.S. PATENT DOCUMENTS 5,676,116 A * 10/1997 Kim ..................... B60K 15/035
                                                      123/518
5,782,258 A * 7/1998 Herbon ............ B60K 15/03519
                                                      137/202

(Continued)

FOREIGN PATENT DOCUMENTS

WO   WO 99/18379   4/1999

OTHER PUBLICATIONS

European Search Report dated Mar. 24, 2015 in European 14188770.3, filed on Oct. 14, 2014.

*Primary Examiner* — Nicolas A Arnett

(74) *Attorney, Agent, or Firm* — Oblon, McClelland, Maier & Neustadt, L.L.P.

(57) ABSTRACT

A method for controlling a filling operation of a vehicular liquid storage system including a tank equipped with a filler pipe and a shut-off valve, the method including detecting the start of a refilling event; while the shut-off valve is open, observing whether a measured fill level of the tank has reached a predetermined fill level; if the predetermined fill level has been reached, performing the following steps: closing the shut-off valve to induce a shut-off of a filling nozzle; when a first pressure criterion is met, opening the shut-off valve; and when a second pressure criterion is met, closing the shut-off valve. The second pressure criterion includes a decrease of pressure inside the tank below a predetermined pressure level.

17 Claims, 3 Drawing Sheets

(51) Int. Cl.
*B67D 7/04* (2010.01)
*B60K 15/035* (2006.01)

(58) Field of Classification Search
USPC .................. 141/1–2, 4–7, 44, 59, 192, 198
See application file for complete search history.

(56) References Cited

U.S. PATENT DOCUMENTS

| | | | |
|---|---|---|---|
| 6,199,574 B1 | 3/2001 | Harris | |
| 6,321,727 B1 * | 11/2001 | Reddy | F02M 25/0809 123/520 |
| 6,386,222 B1 | 5/2002 | Harris | |
| 6,658,923 B2 * | 12/2003 | Fabre | F02M 25/0809 73/114.18 |
| 7,055,557 B1 * | 6/2006 | Jahnke | B60K 15/03519 141/301 |
| 7,823,610 B2 * | 11/2010 | King | B60K 15/03504 137/202 |
| 7,882,824 B2 | 2/2011 | Hill et al. | |
| 9,488,145 B2 * | 11/2016 | Butler | B60K 15/03 |
| 2001/0029933 A1 * | 10/2001 | Fabre | F02M 25/0809 123/520 |
| 2005/0279406 A1 | 12/2005 | Atwood et al. | |
| 2007/0169842 A1 * | 7/2007 | King | B60K 15/03504 141/302 |
| 2009/0078239 A1 | 3/2009 | Hill et al. | |
| 2010/0332108 A1 | 12/2010 | Kato et al. | |
| 2013/0091931 A1 * | 4/2013 | Hart | B67D 7/0486 73/40 |
| 2014/0297071 A1 * | 10/2014 | Dudar | F02D 41/22 701/22 |
| 2015/0192064 A1 * | 7/2015 | Criel | B60R 21/0136 123/529 |
| 2015/0345455 A1 * | 12/2015 | Butler | B60K 15/03 60/301 |
| 2016/0115907 A1 * | 4/2016 | Hagen | B60K 15/03519 137/544 |

\* cited by examiner

METHOD AND SYSTEM FOR CONTROLLING A FILLING OPERATION OF A VEHICULAR LIQUID STORAGE SYSTEM

FIELD OF THE INVENTION

The present invention pertains to the field of vehicular liquid storage systems, in particular fuel tank systems.

BACKGROUND

U.S. Pat. No. 7,882,824 B2 discloses a method for recovering vapor during an onboard refueling operation comprising the steps of: providing a flow path between a fuel tank and a purge canister; providing a valve in the flow path; providing a fuel level sensor for indicating the level of fuel in the fuel tank, and a vapor pressure sensor for indicating the pressure of the fuel vapor in the fuel tank; and actuating the valve to selectively open and close the flow path in response to signals received from the fuel level sensor and the vapor pressure sensor.

It is a disadvantage of the prior art that the point at which the valve is closed after the detection of the nozzle shut-off is not defined and can be chosen arbitrarily. If the valve closing is done at a too high remaining internal tank pressure, the risk of spill-over increases. If the valve closing is done at a too low remaining pressure, the operator can still add some fuel and thus the venting function can be degraded.

SUMMARY OF THE INVENTION

It is an object of embodiments of the present invention to at least partially overcome the drawbacks of the prior art.

According to an aspect of the present invention, there is provided a method for controlling a filling operation of a vehicular liquid storage system comprising a tank equipped with a filler pipe and a shut-off valve, the method comprising: detecting the start of a refilling event; while the shut-off valve is open, observing whether a measured fill level of the tank has reached a predetermined fill level; if the predetermined fill level has been reached, performing the following steps: closing the shut-off valve to induce a shut-off of a filling nozzle; when a first pressure criterion is met, opening the shut-off valve; and when a second pressure criterion is met, closing the shut-off valve; wherein the second pressure criterion comprises a decrease of pressure inside the tank below a predetermined pressure level.

It is an advantage of the present invention that it allows adding an amount of liquid that is sufficiently small not to impair the venting function, such that the topping up can proceed safely and efficiently.

In an embodiment of the method according to the present invention, the opening and closing of the valve are repeated for a plurality of nozzle shut-off instances.

It is an advantage of this embodiment that the traditional behavior of the filling nozzle operators (whether it is the driver or the professional filling station operator), can be accommodated: the embodiment allows for several instances of "topping up".

In an embodiment of the method according to the present invention, the first pressure criterion comprises a stagnation or a decrease of pressure inside the tank.

The occurrence of a stagnation or a decrease of pressure inside the tank has turned out to be a good indicator of the shutting off of the filling nozzle.

In an embodiment of the method according to the present invention, the predetermined pressure level is substantially equal to a hydrostatic pressure induced by a liquid reaching a predetermined level in the filler pipe.

It is an advantage of this embodiment that the amount of liquid allowed to be added at each instance of the topping up process is limited to the volume that can be accommodated by the upper part of the filler pipe.

The term "substantially equal" designates equality within a tolerance of +/−50%, preferably +/−20%, more preferably +/−10%.

In an embodiment, the method according to the present invention further comprises monitoring a pressure variation following sealing of the tank, and generating an estimate of a partial pressure characteristic of the liquid based on a slope of the pressure variation.

It is an advantage of this embodiment that the same setup can be used to determine a partial pressure characteristic (e.g., the Reid Vapor Pressure (RVP)) of the liquid inside the tank. Where the tank is used for storage of gasoline, the RVP is an essential parameter for the proper functioning of the internal combustion engine, and it is important to know the value of this parameter to perform accurate leak detection. For this purpose, sealing the tank includes closing the shut-off valve, closing the purge valve, and closing the filler pipe (in particular, verifying the presence of the fuel cap).

According to an aspect of the present invention, there is provided a computer program product comprising code means configured to cause a processor to carry out the method described above.

According to an aspect of the present invention, there is provided a vehicular liquid storage system comprising a tank equipped with a filler pipe, a shut-off valve, a level gauge, a pressure sensor, and a controller arranged to obtain fill levels from the level gauge and pressure levels from the pressure sensor and to control the shut-off valve, the controller being configured to carry out the method described above.

According to an aspect of the present invention, there is provided a motor vehicle comprising the vehicular liquid storage system described above.

The technical effects and advantages of the computer program product, the vehicular liquid storage system, and the motor vehicle according to the present invention correspond, mutatis mutandis, to those of the corresponding embodiments of the method according to the present invention.

BRIEF DESCRIPTION OF THE FIGURES

These and other technical aspects and advantages of embodiments of the present invention will now be described in more detail with reference to the accompanying drawings, in which.

DESCRIPTION OF EMBODIMENTS

The vehicular liquid storage system of the present invention is preferably a liquid fuel storage system for a vehicle having an internal combustion engine (liquid fuel types may include ethanol, gasoline, liquefied petrol gas, diesel oil, and the like). However, the invention may also be used in conjunction with other vehicular liquids, such as the aqueous urea solutions which are used as an ammonia precursor in selective catalytic reduction (SCR) systems for the treatment of exhaust gases. Throughout the present description, the term "refueling" is used broadly to designate the addition of liquid (fuel or other, as the case may be) to the vehicular liquid storage system.

Throughout the present description, the term "shut-off valve" is used to designate an electronically controlled valve which can be opened or closed, as the case may be, by an electronic signal, with a view to allowing or stopping a refueling operation, and thus controlling the maximum fill level that can be achieved in the tank.

Figure 1:
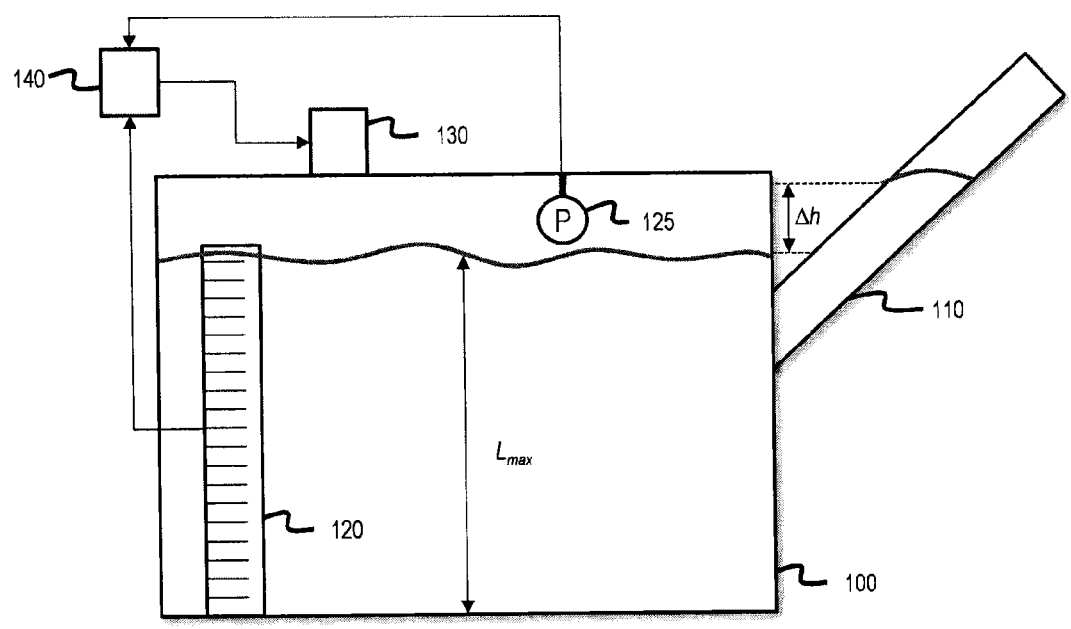
FIG. 1 presents a schematic overview of a vehicular liquid storage system in which the present invention can be used.

FIG. 1 presents a schematic overview of a vehicular liquid storage system, preferably a fuel storage system, in which the present invention can be used. The system comprises a tank 100, in which a level gauge 120 is arranged. Without loss of generality, a tank 100 of a very simple geometry is shown; in reality, the tank may comprise multiple compartments, as is the case for a so-called "saddle tank". In that case, several level gauges would be present for the respective compartments, and the method according to the invention could be applied mutatis mutandis on the basis of the level readings from the compartments with the highest fill level.

Without loss of generality, the following description is written with reference to a system in which the shut-off valve is of a type that is normally closed, and which has to be actuated into its open position to allow liquid to be added. The skilled person will appreciate that the same results can be achieved with a shut-off valve that is normally open, and which has to be actuated into its closed position to induce the termination of the filling operation.

When, during a filling operation (i.e., when liquid is added to the tank via filler pipe 110), the liquid level reaches a predetermined level $L_{max}$, a controller 140, which receives the level signal from the level gauge 120, causes a shut-off valve 130 to close, which causes the filling operation to stop (generally, because a sensor in the filling nozzle detects a rise of pressure inside the tank 100 and the filler pipe 110, triggering the nozzle's shut-off mechanism). The valve 130 is generally in fluid communication with the atmosphere via a venting line, optionally via a vapor absorbing canister (not shown).

When pressure equilibrium is established, the difference in pressure $\Delta p$ between the vapor dome inside the tank 110 and the filler head (the latter normally being at close to atmospheric pressure), is proportional to the excess height $\Delta h$ of the liquid column in the filler pipe 110, by virtue of the hydrostatic relationship $\Delta p = \rho g \Delta h$, where $\rho$ is the density of the liquid and g is the gravitational acceleration constant.

Hence, when the shut-off valve 130 is closed, the level height of the liquid column in the filler pipe will remain stable.

The filling operation normally takes place with an open shut-off valve 130; in that situation, the inflow of liquid will decrease the available volume for the vapor-air mixture, which is being forced out through the valve 130. The escape path provides some resistance to the flow of the vapor-air mixture, which causes a positive $\Delta p$ and thus a certain accumulation of liquid in the filler pipe 110 up to a height $\Delta h$.

When the shut-off valve 130 is suddenly closed during the filling operation, $\Delta p$ and $\Delta h$ will increase until the shut-off mechanism of the nozzle is triggered.

If the shut-off valve 130 is opened and left open when a liquid column of a certain height is still present in the filler pipe, some of the vapor-air mixture will escape through the valve 130 towards the atmosphere (optionally, via the canister), until the pressure in the vapor dome has decreased to atmospheric pressure and $\Delta h$ has returned to zero. Although no complete equilibrium is reached, the above mentioned relation between pressure and liquid column height will hold by approximation at any given time during this relaxation process, such that a pressure measurement in the vapor dome may be considered indicative of the height of the liquid column in the filler pipe 110.

Embodiments of the present invention are based on the insight of the inventors that the "topping up" phase of a filling operation can be made safer and more efficient by judiciously timing repeated closings and openings of the valve at the end of the filling operation. The term "safe" is used to refer to a reduced risk of liquid spill-over during the filling operation, and to unimpaired venting of the tank.

In particular, embodiments of the present invention are based on the insight of the inventors that it is advantageous to allow a "topping up" operation, by briefly opening the valve 130 so as to allow the liquid level in the filler pipe 110 to drop a little, and then closing it again at the point where just enough space has been freed up in the filler pipe 110 to allow adding an amount of liquid that is sufficiently small not to impair the venting function, the topping up can proceed safely and efficiently. This process may be repeated, preferably up to two or three times, most preferably with decreasing amounts of allowed liquid supply.

Figure 2:
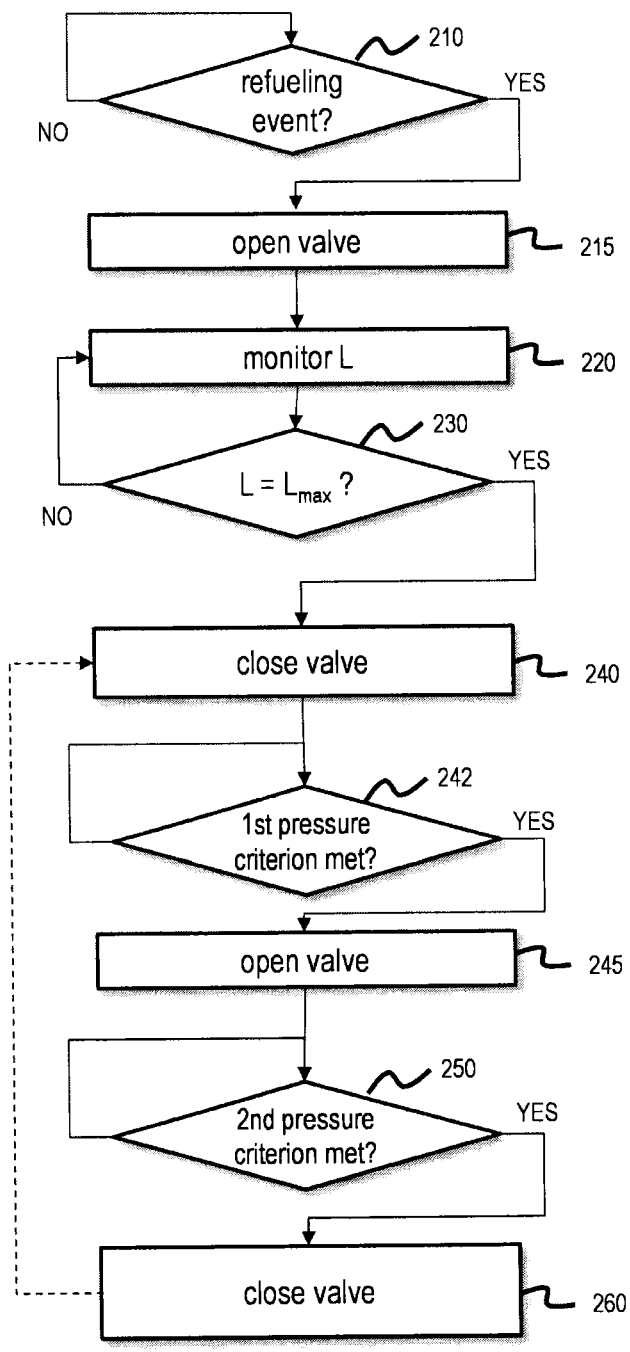
FIG. 2 provides a flow chart of an embodiment of the method according to the present invention.

FIG. 2 provides a flow chart of a method according to an embodiment of the present invention. The method starts by detecting 210 the start of a refilling event. If such an event is detected, the shut-off valve 130 is opened 215, which allows the vapor-air mixture displaced by incoming liquid to escape to the atmosphere, preferably via a canister. During the refilling operation, the fuel level is monitored 220 by means of a level sensor. When a predetermined maximum level is reached 230, the shut-off valve 130 is closed for a first time. This causes the pressure and the liquid column to rise, which in turn triggers the shut-off mechanism of the nozzle. At this point, the pressure in the tank 100 is monitored to observe whether a first pressure criterion is met 242. When this first pressure criterion is met 242, the shut-off valve 130 is opened again 245, to lower the level of the liquid column. The pressure in the tank 100 is then monitored to observe whether a second pressure criterion is met 250. When this second pressure criterion is met 250, the shut-off valve 130 is closed again 260, to fix the level of the liquid column. At this point, the vehicular liquid storage system is ready to receive a small additional amount of liquid, before the nozzle will be shut off again.

Various strategies can be considered to select the criteria 242, 250 for opening 245 and closing 260 the valve. In order to avoid a time consuming and costly calibration process, the pressure value chosen for the reclosing 260 of the valve is preferably set at the internal tank pressure generated inside the fuel tank by the hydrostatic liquid pressure induced by the fuel in the filler pipe within a tolerance of +/−50%, more precisely +/−20%, ideally +/−10%. This calibration has been found to provide an adequate trade-off between the spill-over risk limitation and the overfilling protection.

Where steps 240-260 are applied iteratively, the reclosing pressure value can be set at a higher level in order to discourage the operator from keeping on topping up and potentially overfilling the tank. This will protect the tank from possible in-use damage or breaking due to overfilling.

Figure 3:
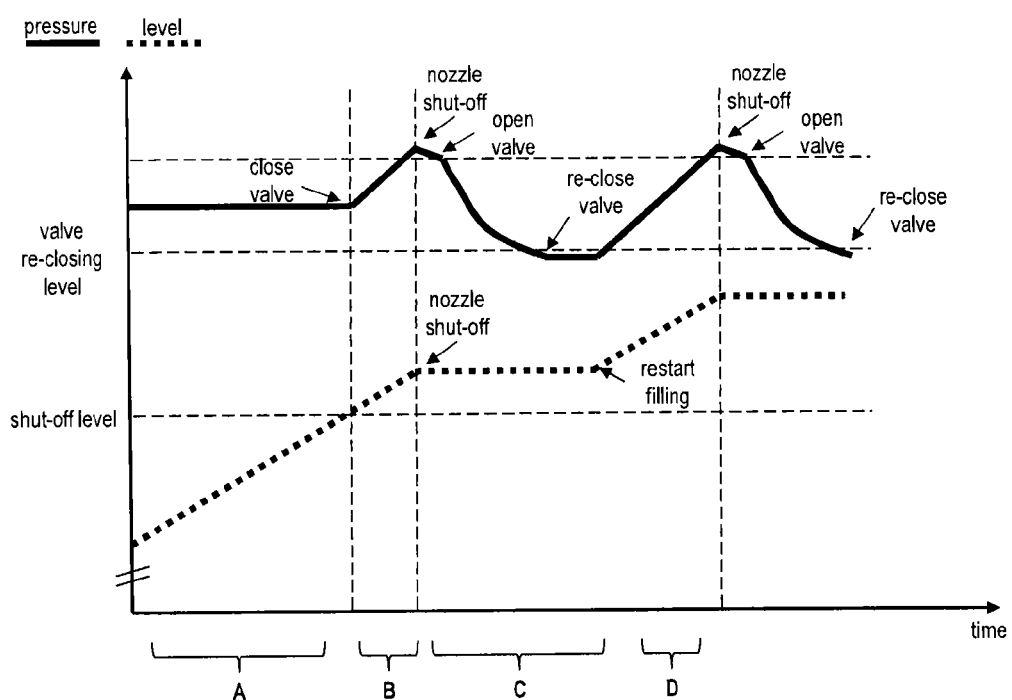
FIG. 3 provides a timing diagram of a filling operation occurring in accordance with a method according to an embodiment of the present invention.

FIG. 3 schematically represents the evolution of the vapor dome pressure and liquid level in the final stages of a refilling operation (including topping up). During the main part of the refilling process (stage A), liquid is flowing into the tank at a steady rate, forcing out the vapor-air mixture via the open valve, which causes a certain, constant pressure level in the vapor dome. When the liquid in the tank reaches a predetermined level, the valve is closed. As liquid is still flowing in, the pressure rapidly rises), and so does the level of liquid in the filler neck (stage B. This causes the nozzle to shut off, whereupon the valve is temporarily reopened (stage C) to allow the liquid in the filler neck to drop sufficiently for a topping up to take place. Without loss of generality, a single topping up operation is shown (stage D).

It is an advantage of the set-up described herein, that it may also be used to determine the vapor pressure of the stored liquid. In all internal combustion engines, it is necessary to measure fuel vapor pressure to control the fuel injection amount, the injection timing, the ignition timing, and others. Known devices for performing such a measurement, such as the one disclosed in US 2010/0332108 A1, rely on a combination of pressure variation and temperature variation to produce an estimate of the Reid Vapor Pressure (RVP). In embodiments of the present invention, the RVP is determined upon the closing of the fuel storage system, following a refilling operation (i.e., when the cap is placed back, or an internal closing mechanism is applied, and when the valve is in its closed position). The pressure evolution following the closing of the storage system is monitored. The initial pressure in the vapor dome is determined by the hydrostatic equilibrium, as described in detail above. Once the fuel system is sealed, the fuel vapor pressure will change as a result of the vaporization of liquid fuel, to a point where the vapor pressure reaches an equilibrium. The slope of the change in pressure is indicative of the volatility of the fuel, and thus of the RVP. The accuracy of the RVP estimation can be further improved by knowledge of the fuel and vapor dome temperature (if one or more temperature sensors are present) and/or refueling parameters stored by the controller (e.g., flow rate, timing between shut-off instances, timing of cap installation, equilibrium characterization before refueling, . . . ).

In a further variant, the pressure variation is monitored immediately upon the closing of the fuel system. In yet another variant, it could be advantageous to release the pressure shortly after cap closing detection. This cap closing detection would be based on the change of slope of the internal tank pressure after a nozzle shut-off. Typically an orifice can be implemented inside the recirculation line to tune the pressure reduction speed. To further increase the precision of the fuel volatility prediction the internal tank pressure is released during a short period after the cap closing detection to have the pressure build-up starting within fixed internal tank pressure boundaries.

The aforementioned steps to determine RVP can also be used independently of the method represented by FIGS. 2 and 3. Further details about these steps are disclosed in a companion application entitled "Method and system for determining the volatility of a fuel", filed by the same applicant and on the same day as the present application.

The present invention also pertains to a vehicular liquid storage system (see also FIG. 1) comprising a controller 130 configured to carry out the methods described above. The controller 130 may be implemented in dedicated hardware (e.g., ASIC), configurable hardware (e.g., FPGA), programmable components (e.g., a DSP or general purpose processor with appropriate software), or any combination thereof. The same component(s) may also include other functions.

While the invention has been described hereinabove with reference to specific embodiments, this was done to clarify and not to limit the invention. The skilled person will appreciate that various modifications and different combinations of disclosed features are possible without departing from the scope of the invention.

The invention claimed is:

1. A method for controlling a filling operation of a vehicular liquid storage system comprising a tank equipped with a filler pipe and a shut-off valve, the method comprising:
   detecting the start of a refilling event;
   while the shut-off valve is open, observing whether a measured fill level of said tank has reached a predetermined fill level;
   if said predetermined fill level has been reached, performing the following steps:
   closing the shut-off valve to induce a shut-off of a filling nozzle;
   when a first pressure criterion is met, opening the shut-off valve; and
   in response to a decrease of pressure inside said tank below a predetermined pressure level, closing the shut off valve.

2. The method according to claim 1, wherein said opening and closing of said shut-off valve are repeated for a plurality of nozzle shutoff instances.

3. The method according to claim 1, wherein said first pressure criterion comprises a stagnation or a decrease of pressure inside said tank.

4. The method according to claim 1, wherein said predetermined pressure level is substantially equal to a hydrostatic pressure induced by a liquid reaching a predetermined level in said filler pipe.

5. The method according to claim 1, further comprising monitoring a pressure variation following said closing of the shut-off valve, and generating an estimate of a partial pressure characteristic of said liquid based on a slope of said pressure variation.

6. A computer program product for controlling a filling operation of a vehicular liquid storage system comprising a tank equipped with a filler pipe, a shut-off valve, a level gauge, a pressure sensor, and a controller, said computer program product comprising code means configured to cause the controller to carry out a method comprising:
   detecting the start of a refilling event;
   while the shut-off valve is open, observing whether a measured fill level of said tank has reached a predetermined fill level;
   if said predetermined fill level has been reached performing the following steps:
   closing the shut-off valve to induce a shut-off of a filling nozzle;
   when a first pressure criterion is met, opening the shut-off valve; and
   in response to a decrease of pressure inside said tank below a predetermined pressure level, closing the shut off valve.

7. A vehicular liquid storage system comprising a tank equipped with a filler pipe, a shut-off valve, a level gauge, a pressure sensor, and a controller arranged to obtain fill levels from said level gauge and pressure levels from said pressure sensor and to control said shut-off valve, said controller being configured to carry out a method comprising:

detecting the start of a refilling event;

while the shut-off valve is open, observing whether a measured fill level of said tank has reached a predetermined fill level;

if said predetermined fill level has been reached performing the following steps:

closing the shut-off valve to induce a shut-off of a filling nozzle;

when a first pressure criterion is met, opening the shut-off valve; and in response to a decrease of pressure inside said tank below a predetermined pressure level, closing the shut off valve.

8. A motor vehicle comprising the vehicular liquid storage system according to claim 7.

9. The vehicular liquid storage system according to claim 7, wherein said liquid is a fuel.

10. The vehicular liquid storage system according to claim 9, wherein said fuel is selected from the group consisting of ethanol, gasoline, liquefied petrol gas, and diesel oil.

11. The vehicular liquid storage system according to claim 7, wherein said liquid is aqueous urea.

12. The vehicular liquid storage system according to claim 7, wherein said tank comprises multiple compartments.

13. The vehicular liquid storage system according to claim 12, wherein said tank is a saddle tank.

14. The vehicular liquid storage system according to claim 12, wherein each compartment of said tank comprises a level gauge.

15. The vehicular liquid storage system according to claim 14, wherein said observing whether a measured fill level of said tank has reached a predetermined fill level is based on a level reading from the compartment with a highest fill level.

16. The vehicular liquid storage system according to claim 7, further comprising an orifice implemented inside a recirculation line.

17. The vehicular liquid storage system according to claim 16, wherein said orifice facilitates tuning of pressure reduction speed.

* * * * *